June 9, 1925.
W. ROHN
1,540,806
VESSEL FOR CONVEYING AND STORING LIQUEFIED GASES
Filed Jan. 3, 1921
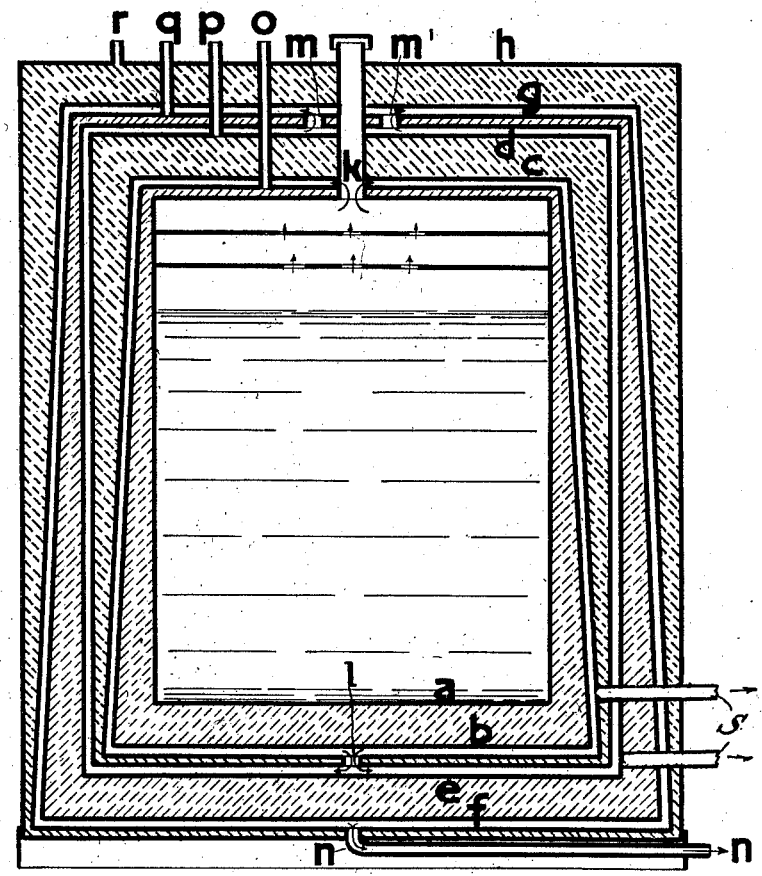
INVENTOR:
Wilhelm Rohn
By Wm Wallace White
ATTY.

Patented June 9, 1925.

1,540,806

UNITED STATES PATENT OFFICE.

WILHELM ROHN, OF HANAU-ON-THE-MAIN, GERMANY.

VESSEL FOR CONVEYING AND STORING LIQUEFIED GASES.

Application filed January 3, 1921. Serial No. 434,822.

(GRANTED UNDER THE PROVISIONS OF THE ACT OF MARCH 3, 1921, 41 STAT. L., 1313.)

*To all whom it may concern:*

Be it known that I, WILHELM ROHN, a citizen of the German Republic, residing at Hanau-on-the-Main, Germany, have invented certain new and useful Improvements in Vessels for Conveying and Storing Liquefied Gases (for which I have filed an application in Great Britain, July 12, 1920, No. 20,988, and have been granted a patent in Germany Sept. 9, 1919, No. 302,532), of which the following is a specification.

Dewar's glass vessel with walls lined with a reflecting agent represents an almost ideal contrivance for conveying and storing small quantities of liquefied gases. For larger quantities vessels of metal have been made on the same principle and their insulating properties were also fairly satisfactory. But an arbitrary enlargement of such vessels is not possible because exceedingly large vessels cannot be made sufficiently gas-tight to maintain a satisfactory vacuum, and besides the weight is excessive. For this reason vessels for the storage of liquid air have been proposed by American inventors (see U. S. Patent 673,073) that are constructed on different lines. These vessels are not subject to limitations of size and yet possess satisfactory insulating properties without being excessively heavy. The vessels built according to this plan consist of a number of insulating shells, one within the other, that are filled with wool-waste, feathers, felt or the like, and in or between which the cold evaporated gases engendered by the liquid air are caused to stream. But these vessels still fall far short of the most favorable results that may be obtained by further consistently applying this principle. They fail utterly where liquid hydrogen (for instance) is to be stored and conveyed because the insulating capacity of such agents as wool, feathers, felt or the like that are filled with hydrogen is five to eight times worse than that of the same materials filled with air. Since in addition to this the amount of warmth required to evaporate one litre of liquid hydrogen is five times as small, and the chilling effect of the cold gas produced from a litre of liquid hydrogen is only one and a half times greater than that of liquid air, the time for which a vessel for liquid hydrogen constructed according to the said American plan would satisfactorily store liquid hydrogen would be ten times shorter than that for liquid air. (Dewar vessels are also three to three and a half times worse for liquid hydrogen than for liquid air because in general they only turn the warmth required for evaporation but not the chilling effect of the evaporated gas to account.)

But it is just the production of suitable vessels for liquid hydrogen that would be particularly desirable as this would be a convenient means for supplying such consumers as autogenous welding works and airships whose dimensions are being continually increased. The hydrogen, instead of being conveyed in steel bottles in the form of a compressed gas, would then be transported in the afore-described vessels in a liquid state, and an enormous saving in the weight to be carried would then be achieved.

A vessel that is suitable for liquid hydrogen would also be eminently adapted for any other gas used for technical purposes, because it is just in the case of liquid hydrogen, whose heat of evaporation is small and which is an extraordinarily good conductor of heat, that the problem is particularly difficult to solve.

A type of vessel is hereinafter described that is equally efficient for all liquefied gases including hydrogen and which possesses much higher qualities than any of the previously proposed vessels and may be made much lighter than these.

A diagrammatic cross sectional view of the new type of vessel is shown in the drawing. It may consist of four insulating shells placed inside each other. The inner and outer airtight walls $a$ and $b$, $c$ and $d$, $e$ and $f$, $g$ and $h$ of the shells may consist of any suitable material such as sheet or papier mâché. The interior of each shell that is shown in the form of a four cornered hatched belt may be filled with a suitable insulating agent such as feathers, cork dust, magnesia etc. Circulation spaces are left between each pair of insulating shells so that three of these spaces are formed that are bounded by the sheet metal walls $b$ and $c$, $d$ and $e$, $f$ and $g$. The cold gas that evaporates in the innermost vessel $a$ passes at $k$ into the first circulation space, whence it passes at $l$ into the second circulation space, from which it flows at $m$ and $m^1$ into the third circulation space and thence through the pipe $n^1$—$n$ into the atmosphere. During its passage through the circulation spaces the gas gives off practically all the cold it contains to compensate for the warmth that penetrates from without.

As above stated, the walls $a$ and $b$ to $g$ and $h$ are made of airtight material. From the space between each respective pair of said walls a small pipe $o$, $p$, $q$, $r$, through which a suitable gas may be injected into the shell, leads to the exterior.

The gases chosen for filling the shells will be decided by the following facts: Experiments will show that the insulating properties of a certain packing material, say feathers, will improve the nearer the average temperature of the particular insulating space is to the temperature of condensation of the particular gas used for filling the said space, so that for example the insulating properties of a certain space filled with feathers and air is four to five times as good at about —160° Celsius as it is at 0° Celsius. Hence the insulating properties of such vessels having various insulating shells which are stuffed, say, with feathers, can be considerably increased by charging the shells with gases whose points of condensation are just a little lower than the average temperature existing in their interior. If this is done the points of condensation of the gases in the series of shells, commencing from the interior, will rise from shell to shell. Thus if the vessel is to contain hydrogen the innermost shell would be charged with hydrogen, the next with nitrogen, the next with nitric oxide, and the next with carbonic acid in order to obtain the most favorable insulating properties.

It can also be demonstrated by experiment that the insulating capacity of a layer of feathers (for instance) of a certain thickness at so low a temperature is not by any means increased more and more by stuffing more and more feathers into the space in question, as is the case at an ordinary temperature. In reality, at low temperatures there is a definite density of the feathers for each kind of gas at which the highest possible insulating capacity is reached, whilst a further increase of the density of the feathers only causes an increase of weight without improving the insulating qualities. Hence, to obtain the smallest possible weight, the feathers stuffed into each shell will preferably be only of such a quantity that the density most favorable for insulating purposes is attained. (This degree of density is obtained for instance with a certain kind of downy feathers, at a temperature of —160° Celsius and with an air charge, when 20 grams of feathers are used per litre; or under the same conditions but with a hydrogen charge when 50 to 70 grams of feathers per litre are employed.)

In the similar kinds of vessels heretofore employed the various insulating shells were made equally thick at all of their parts. But by a simple consideration the fact is revealed that the thickness of the insulating layer or shell should be proportional at each point to the difference of temperatures existing thereat between the inner and outer surfaces of the shell. Thus the difference of temperatures between the inner and outer sides of an insulating shell is always approximately zero in the neighbourhood of the openings $k$, $l$, $m$, $n$ that connect one circulating space with the next and the greatest difference is reached at the point opposite to, or furthest away from, the particular opening. Hence the insulating shells are preferably made of tapering cross-section as indicated in the drawing, by which measure the insulating capacity is increased in a ratio of 1:1.6 with the same amount of insulating material, or, with an equal insulating capacity, a saving of 30% by weight is accomplished.

In this manner vessels can be produced that are capable of storing 1000 litres of liquid air for more than 60 days, or liquid hydrogen for about 30 days, so that they are even better for liquid air than the vessels constructed on Dewar's principle. In addition, their weight only amounts to 0.2 to 0.5 kg. per cubic metre of gas obtainable from them, whilst the steel bottles now employed for conveying gases under pressure weigh about 12 to 15 kgs. per cubic metre of gas.

Finally the described type of vessel according to the invention enables the speed of evaporation to be easily regulated by putting one or more circulating spaces out of action. Formerly attempts were made to accomplish this by dipping metal rods to various depths into the liquid gas to be evaporated; but the protruding ends of the rods soon became coated with ice which rendered their effect insufficient. To obtain satisfactory results with the vessel constructed according to the invention the gas, instead of being allowed to pass out through $n$, may be caused to pass out sooner by means of small tubes $s$ that lead from suitable points of the circulating spaces to the exterior, it being understood, of course, that suitable means will be provided for closing the tubes $s$ when these tubes are not in operation.

I claim:

1. A vessel for storing (or conveying) liquefied gas consisting of a plurality of hollow shells placed one within the other, the hollow space in each shell being filled with insulating material and gas, the gas being of a kind whose point of condensation is as little below the average temperature existing in the said space as is possible under practical conditions, and the quantity of the said insulating material being such that the particular combination of the density of the material and temperature is obtained that produces as nearly as possible the highest possible insulating effect, substantially as described.

2. A vessel for storing (or conveying) liquefied gas consisting of a plurality of hollow shells placed one within the other, the hollow space in each shell being filled with insulating material and gas, the gas being of a kind whose point of condensation is as little below the average temperature existing in the said space as is possible under practical conditions, the quantity of the said insulating material being such that the particular combination of the density of the material and temperature is obtained that produces as nearly as possible the highest possible insulating effect, and the thickness of the said shells differing at their various parts in proportion to the differences of temperature existing thereat between the inner and the outer surface of the shell at the various points.

3. A vessel for storing (or conveying) liquefied gas consisting of a plurality of hollow shells placed one within the other so as to leave a circulation space between each two shells, the hollow space in each shell being filled with insulating material and gas, the gas being of a kind whose point of condensation is a little below the average temperature existing in the said space as is possible under practical conditions, the quantity of the said insulating material being such that the particular combination of the density of the material and temperature is obtained which produces as nearly as possible the highest possible insulating effect, and the thickness of the said shells differing at their various parts in proportion to the differences of temperature existing thereat; gas passages from the said hollow spaces to the circulation spaces, and a pipe (or pipes) associated with the said circulation spaces so as to afford communication between the latter and the exterior of the vessel and adapted to increase or decrease the number of circulation spaces traversed by the said gas, whereby the speed of evaporation of a gas contained in the vessel may be regulated within wide limits.

4. A vessel for liquefied gas comprising a reservoir for the liquid gas with a double-wall envelope, insulating material between the walls of the envelope, and a gas between the walls of the envelope which is of such a kind that, at the temperature to which it is subjected, it is just above its point of condensation.

In testimony whereof I have signed this specification in the presence of two witnesses.

Dr. WILHELM ROHN.

Witnesses:
 WILHELM HIRAEUS,
 FRITZ GEMOLL.